United States Patent
Lee

(10) Patent No.: US 12,105,949 B2
(45) Date of Patent: Oct. 1, 2024

(54) TOUCHPAD DEVICE AND OPERATION METHOD OF THE SAME

(71) Applicant: SUNREX TECHNOLOGY CORP., Taichung (TW)

(72) Inventor: Chih-Cheng Lee, Taichung (TW)

(73) Assignee: SUNREX TECHNOLOGY CORP., Taichung (TW)

( * ) Notice: Subject to any disclaimer, the term of this patent is extended or adjusted under 35 U.S.C. 154(b) by 0 days.

(21) Appl. No.: 18/311,565

(22) Filed: May 3, 2023

(65) Prior Publication Data

US 2024/0053881 A1 Feb. 15, 2024

(30) Foreign Application Priority Data

Aug. 12, 2022 (TW) .................................. 111130400

(51) Int. Cl.
G06F 3/04883 (2022.01)
G06F 3/0354 (2013.01)
G06F 3/041 (2006.01)

(52) U.S. Cl.
CPC ...... *G06F 3/04883* (2013.01); *G06F 3/03545* (2013.01); *G06F 3/04162* (2019.05); *G06F 2203/04101* (2013.01)

(58) Field of Classification Search
CPC .. G06F 3/03547; G06F 3/04162; G06F 3/041; G06F 3/04883; G06F 3/03545; G06F 3/0488; G06F 2203/04101
See application file for complete search history.

(56) References Cited

U.S. PATENT DOCUMENTS

| | | | | |
|---|---|---|---|---|
| 9,141,211 | B2* | 9/2015 | Feng | G06F 3/0416 |
| 10,318,034 | B1* | 6/2019 | Hauenstein | G06F 3/04842 |
| 11,392,226 | B2* | 7/2022 | Zou | G06F 3/04162 |
| 11,886,699 | B2* | 1/2024 | Westerman | G06F 3/04186 |
| 11,941,189 | B2* | 3/2024 | Lee | G06F 3/04166 |
| 2006/0071915 | A1* | 4/2006 | Rehm | G06F 1/169 |
| | | | | 345/173 |
| 2007/0285405 | A1* | 12/2007 | Rehm | G06F 1/1616 |
| | | | | 345/173 |
| 2009/0256817 | A1* | 10/2009 | Perlin | G06F 3/0233 |
| | | | | 178/18.05 |
| 2011/0169756 | A1* | 7/2011 | Ogawa | G06F 3/03545 |
| | | | | 345/173 |
| 2012/0158629 | A1* | 6/2012 | Hinckley | G06F 3/04186 |
| | | | | 345/173 |
| 2018/0074637 | A1* | 3/2018 | Rosenberg | G06F 3/04166 |
| 2024/0004532 | A1* | 1/2024 | Soli | G06F 3/04812 |

* cited by examiner

*Primary Examiner* — Doon Y Chow
(74) *Attorney, Agent, or Firm* — Birch, Stewart, Kolasch & Birch, LLP

(57) ABSTRACT

A touchpad device is to be operated by using a stylus pen, and includes a touchpad and a controller that are connected to each other. The controller is connected to an electronic device that includes a display panel, and operates in a stylus-pen mode where a handwriting area is presented on the display panel. When it is determined that a distance between the stylus pen and the touchpad is less than a preset pen-hover distance but is non-zero, the controller operates in a hover-move sub-mode where the controller outputs a control signal to enable the electronic device to present, in the handwriting area, the cursor moving, without presenting a trace of the cursor.

10 Claims, 10 Drawing Sheets

TOUCHPAD DEVICE AND OPERATION METHOD OF THE SAME

CROSS-REFERENCE TO RELATED APPLICATION

This application claims priority to Taiwanese Invention Patent Application No. 111130400, filed on Aug. 12, 2022.

FIELD

The disclosure relates to a touchpad device and an operation method of the same.

BACKGROUND

Conventionally, a tablet computer or a 2-in-1 PC (also known as convertible laptop, 2-in-1 tablet, 2-in-1 laptop, 2-in-1 detachable, laplet, tabtop, laptop tablet or 2-in-1) includes a touchscreen that allows a user to write or draw thereon. However, it is more inconvenient to write on a touchscreen that is in an upright position than on a touchscreen that is in a laid-down position, and it is troublesome for the user to frequently change the position of the touchscreen between the upright position and the laid-down position.

An iPad developed by Apple Inc. allows a user to operate the iPad by using a Magic Trackpad (which is an external touchpad) developed by Apple Inc. However, the Magic Trackpad does not support an Apple Pencil developed by Apple Inc., so the user cannot use a Magic Trackpad and an Apple Pencil together to operate an iPad. Moreover, an iPad does not support an absolute positioning device (e.g., a conventional digitizer not developed by Apple Inc.), so the user also cannot use the conventional digitizer and a general stylus pen that is compatible with the conventional digitizer together to operate an iPad.

SUMMARY

Therefore, an object of the disclosure is to provide a touchpad device and an operation method of a touchpad device that can alleviate at least one of the drawbacks of the prior art.

According to one aspect of the disclosure, the touchpad device is adapted to be operated by using a stylus pen. The touchpad device includes a touchpad and a controller.

The controller is electrically connected to the touchpad, is adapted to be electrically connected to an electronic device that includes a display panel, and is configured to operate in a stylus-pen mode.

The stylus-pen mode includes steps of controlling the electronic device to present a handwriting area on the display panel, and when it is determined that a distance between the stylus pen and the touchpad is less than a preset pen-hover distance but is non-zero, operating in a hover-move sub-mode.

The hover-move sub-mode includes steps of: when it is determined that a cursor is within the handwriting area and that the stylus pen is moved from a first positon directly above a first contact position on the touchpad toward a second position directly above a second contact position on the touchpad and then moved downward to touch the second contact position, determining a moving vector related to movement from the first contact position to the second contact position on the touchpad; outputting a first control signal to the electronic device to enable the electronic device to present, on the display panel, the cursor moving in the handwriting area according to the moving vector, without presenting a trace of the cursor.

According to another aspect of the disclosure, the operation method is to be implemented by a controller of a touchpad device. The touchpad device further includes a touchpad and is operable by using a stylus pen. The controller is electrically connected to the touchpad and an electronic device that includes a display panel. The operation method includes a step of operating in a stylus-pen mode. The stylus-pen mode includes steps of:

controlling the electronic device to present a handwriting area on the display panel, and when it is determined that a distance between the stylus pen and the touchpad is less than a preset pen-hover distance but is non-zero, operating in a hover-move sub-mode including steps of when it is determined that a cursor is within the handwriting area and that the stylus pen is moved from a first positon directly above a first contact position on the touchpad toward a second position directly above a second contact position on the touchpad and then moved downward to touch the second contact position, determining a moving vector related to movement from the first contact position to the second contact position on the touchpad, outputting a first control signal to the electronic device to enable the electronic device to present, on the display panel, the cursor moving in the handwriting area according to the moving vector, without presenting a trace of the cursor.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
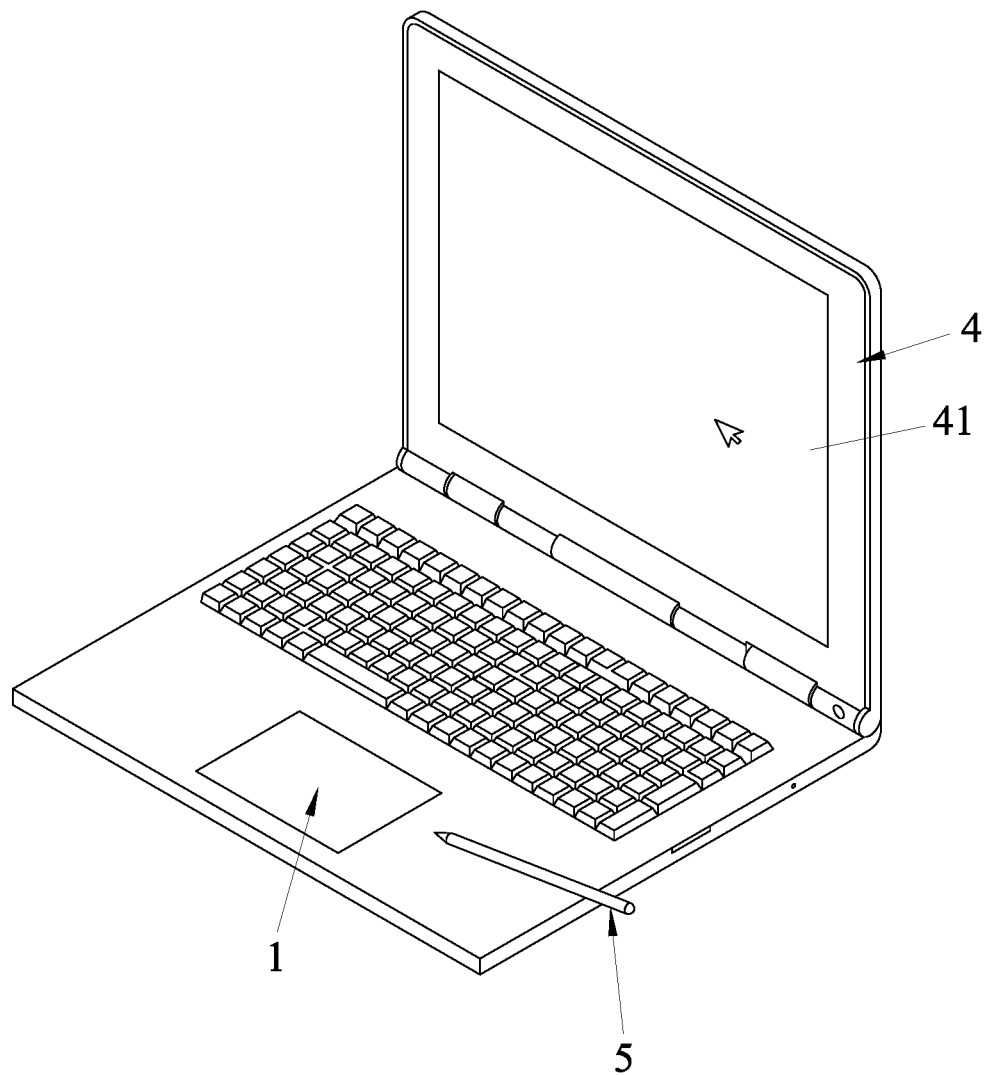
FIG. 1 is a perspective view illustrating an example of an electronic device that integrates with a touchpad device according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
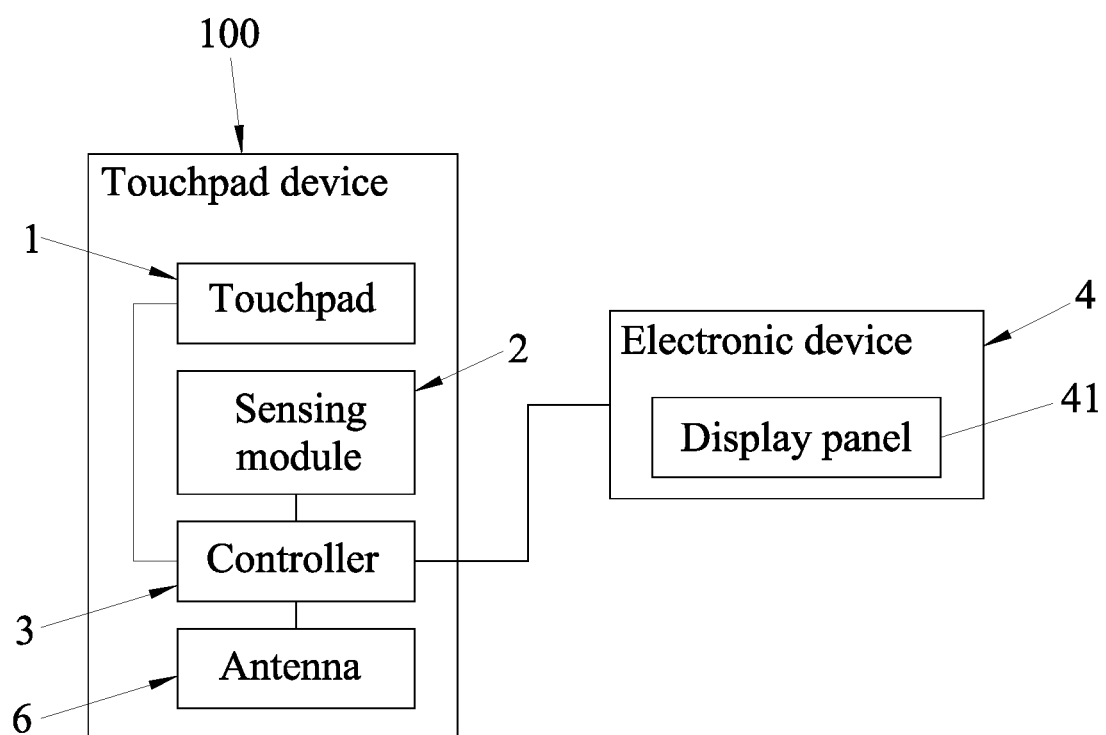
FIG. 2 is a block diagram illustrating the touchpad device according to an embodiment of the disclosure.

Referring to FIGS. 1 and 2, an embodiment of a touchpad device 100 according to the disclosure is illustrated. The touchpad device 100 is adapted to be operated by using one of a stylus pen 5 and a finger (not shown).

The touchpad device 100 includes a touchpad 1, a sensing module 2, an antenna 6 and a controller 3. The controller 3 is electrically connected to the touchpad 1, the sensing module 2 and the antenna 6. In addition, the controller 3 is adapted to be electrically connected to an electronic device 4 that includes a display panel 41. In this embodiment, the touchpad device 100 is integrated into the electronic device 4, and the sensing module 2 is integrated into the touchpad 1. It is worth to note that an electric connection between the controller 3 and the electronic device 4 may be a wired connection (e.g., a connection through a universal serial bus (USB) connector) or a wireless connection (e.g., a connection supporting Bluetooth® standards).

The sensing module 2 is configured to output a detection signal to the controller 3 when detecting that an object (e.g., a finger or a stylus pen) touches the touchpad 1. Specifically, the sensing module 2 includes a plurality of capacitive sensing components (not shown). When an object (e.g., a finger) touches the touchpad 1, an induction area is defined by those of the capacitive sensing components that are capacitively coupled with the object, and the sensing module 2 is configured to generate the detection signal that indicates the induction area, and to output the detection signal to the controller 3. The controller 3 is configured to determine, based on the induction area indicated by the detection signal, whether a finger touches the touchpad 1. It is worth to note that an area of a fingertip is usually larger than an area of a nib of the stylus pen 5, so an induction area attributed to the finger touching the touchpad 1 would be greater than an induction area attributed to the stylus pen 5 touching the touchpad 1. In particular, when it is determined that the induction area indicated by the detection signal is greater than a predefined area (e.g., 0.5 cm$^2$), the controller 3 determines that a finger touches the touchpad 1. Otherwise, the controller 3 determines that it is not a finger that is touching the touchpad 1.

The stylus pen 5 is capable of emitting an electromagnetic signal, and the antenna 6 is configured to receive the electromagnetic signal emitted by the stylus pen 5. The controller 3 is configured to determine a distance between the stylus pen 5 and the touchpad 1 based on an intensity of the electromagnetic signal received by the antenna 6. The stylus pen 5 may be implemented by an Apple Pencil, but is not limited thereto. The electromagnetic signal has a voltage ranging from ±15 V to ±25 V, a duty cycle of 50%, and a frequency ranging from 200 kHz to 500 kHz. The antenna 6 may be made of metal and/or indium tin oxide (ITO).

It should be noted that when the nib of the stylus pen 5 is in proximity to or in contact with the touchpad 1 (e.g., when a distance between the stylus pen 5 and the touchpad 1 is smaller than 1 cm), the sensing module 2 is configured to output to the controller 3 a positioning signal that indicates which one(s) of the capacitive sensing components detect presence of the nib of the stylus pen 5 based on capacitive coupling. Thus, the controller 3 is capable of determining a position of the nib of the stylus pen 5 relative to the touchpad 1 based on the positioning signal received from the sensing module 2.

The controller 3 may be implemented by a central processing unit (CPU), a microprocessor, a micro control unit (MCU), a system on a chip (SoC), or any circuit configurable/programmable in a software manner and/or hardware manner to implement functionalities discussed in this disclosure.

The electronic device 4 may be implemented by an iPad, a Mac, an iPhone, a Chromebook, an IBM PC compatible computer, a laptop computer, a notebook computer, a tablet computer or the like, but is not limited thereto.

The display panel 41 may be implemented by a liquid-crystal display (LCD), a light-emitting diode (LED) display, a plasma display panel, a projection display or the like. However, implementation of the display panel 41 is not limited to the disclosure herein and may vary in other embodiments.

The controller 3 is configured to operate in one of a scanning mode, a stylus-pen mode and a finger-touch mode.

Figure 4:
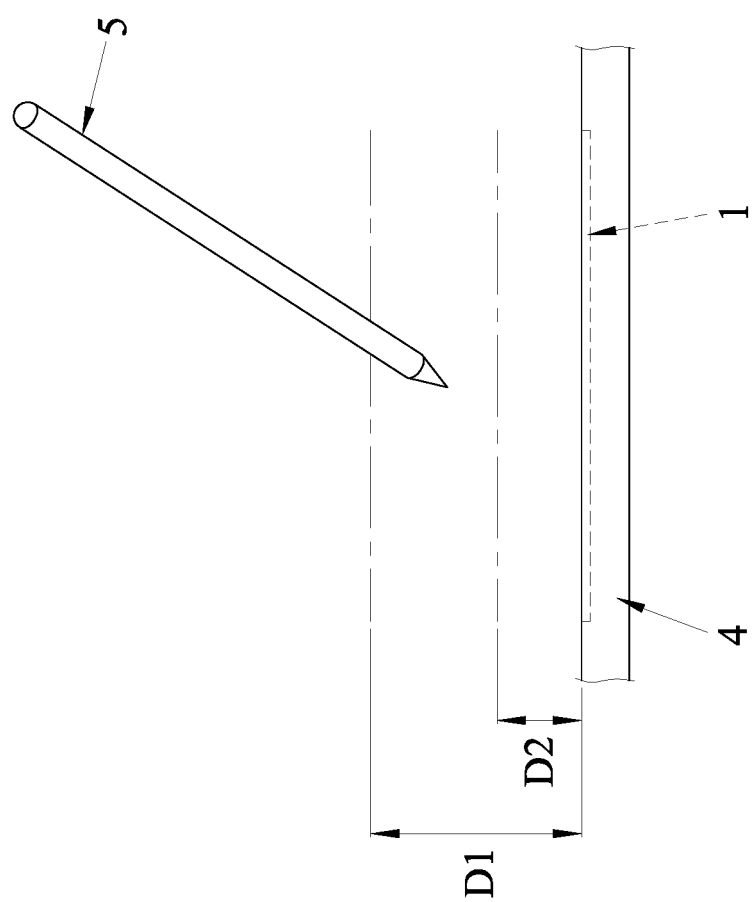
FIG. 4 is a schematic diagram illustrating a preset pen-in-range distance and a preset pen-hover distance according to an embodiment of the disclosure.

The controller 3 is configured to first operate in the scanning mode to determine whether a finger or the stylus pen 5 is present (e.g., touching or approaching the touchpad 1). Specifically, the controller 3 determines that a finger is present (i.e., touching the touchpad 1) upon receiving the detection signal from the sensing module 2, and determines that the stylus pen 5 is present (i.e., approaching the touchpad 1) upon receiving the electromagnetic signal from the antenna 6. When it is determined that the stylus pen 5 is present, the controller 3 is configured to further determine whether the distance between the stylus pen 5 and the touchpad 1 is less than a preset pen-in-range distance (D1) (see FIG. 4). In particular, the controller 3 does not output any control signal to the electronic device 4 when operating in the scanning mode. The controller 3 is configured to switch to the stylus-pen mode when it is determined that the distance between the stylus pen 5 and the touchpad 1 is less than the preset pen-in-range distance (D1), and to switch to the finger-touch mode to allow using a finger to operate the touchpad device 100 when it is determined that a finger is touching the touchpad 1. In this embodiment, the preset pen-in-range distance (D1) is 3 cm, but is not limited thereto.

When operating in the finger-touch mode, the controller 3 is configured to determine whether the electronic device 4 is a Mac, an iPad or an iPhone. Specifically, the touchpad device 100 further includes a manual electric switch (e.g., a toggle switch or a DIP switch) that is configured to be operated by a user and to output to the controller 3 an indication signal indicating whether the electronic device 4 is a Mac, an iPad or an iPhone based on the user operation, and the controller 3 is configured to determine which one of a Mac, an iPad and an iPhone the electronic device 4 is based on the indication signal. The controller 3 is configured to communicate with the electronic device 4 in a protocol supported by a Magic Trackpad when it is determined that the electronic device 4 is a Mac, an iPad or an iPhone, and to communicate with the electronic device 4 in a Windows Precision Touchpad (PTP) protocol when it is determined that the electronic device 4 is not a Mac, an iPad, or an iPhone. A user is able to use his/her finger to operate the touchpad device 100 to enable the electronic device 4 to present, on the display panel 41, a cursor being moved or a line being drawn. It is worth to note that a line being drawn in the finger-touch mode is usually presented by a resolution (e.g., 600 DPI) that is lower than a resolution (e.g., at least 4096 DPI) by which a line being drawn in the stylus-pen mode is presented.

It should be noted that when the controller 3 operates in the stylus-pen mode, the controller 3 would bypass any operation that is related to the finger-touch mode. In other words, the controller 3 does not output any control signal to the electronic device 4 in response to any user operation performed by a finger touching the touchpad 1.

Figure 3:
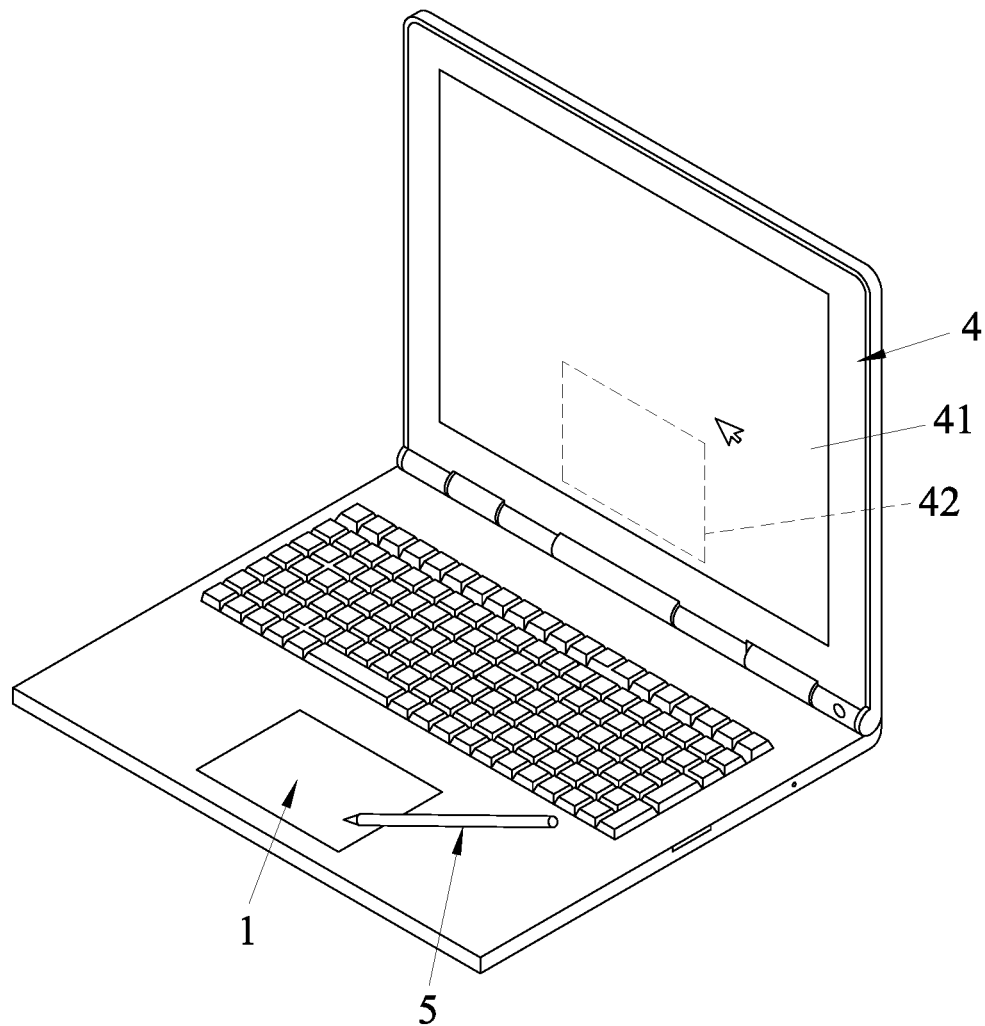
FIG. 3 is a schematic diagram illustrating an example of the touchpad device operating in a stylus-pen mode according to an embodiment of the disclosure.

The stylus-pen mode includes a hover-move sub-mode and an inking sub-mode. When operating in the stylus-pen mode, the controller 3 is configured to control the electronic device 4 to present a handwriting area 42 (see FIG. 3) on the display panel 41. It should be noted that the handwriting area 42 and the touchpad 1 are similar in shape; that is to say, a linear dimension of the handwriting area 42 (i.e., length or width) is proportional to a linear dimension of the touchpad 1. At the same time, the controller 3 is configured to determine whether a distance between the stylus pen 5 and the touchpad 1 is less than a preset pen-hover distance (D2) (see FIG. 4) but is non-zero, and to determine whether the stylus pen 5 is in contact with the touchpad 1. The preset pen-hover distance (D2) is smaller than the preset pen-in-range distance (D1). In this embodiment, the preset pen-hover distance (D2) is 1 cm, but the preset pen-hover distance (D2) is not limited to the disclosure herein and may vary in other embodiments. The controller 3 is configured to switch to the hover-move sub-mode when it is determined that the distance between the stylus pen 5 and the touchpad 1 is less than the preset pen-hover distance (D2) but is non-zero. The controller 3 is configured to switch to the inking sub-mode when it is determined that the stylus pen 5 is in contact with the touchpad 1.

In a condition where the controller 3 operates in the hover-move sub-mode, when it is determined that the cursor is within the handwriting area 42 and that the stylus pen 5 is moved from a first positon directly above a first contact position on the touchpad 1 toward a second position directly above a second contact position on the touchpad 1 and then moved downward to touch the second contact position, the controller 3 is configured to determine a moving vector related to movement from the first contact position to the second contact position on the touchpad 1, and to determine whether the electronic device 4 is an iPad.

When it is determined that the electronic device 4 is an iPad in the hover-move sub-mode, the controller 3 is configured to output a first control signal compatible with a human interface device (HID) protocol to the electronic device 4 to enable the electronic device 4 to present, on the display panel 41, the cursor moving in the handwriting area 42 according to the moving vector in a manner that the cursor starts to move from an original point where the cursor originally stayed before moving and that a step size of movement of the cursor is presented in a relatively low resolution (e.g., 600 DPI), without presenting a trace of the cursor. Hereinafter, such manner of cursor movement is also referred to as relative positioning. In particular, a distance of the movement of the cursor is proportional to a magnitude of the moving vector, and a direction of the movement of the cursor is parallel to a direction of the moving vector when they are projected on the same imaginary plane. It is worth to note that the first control signal enables the electronic device 4 to simulate a situation where the cursor is being moved by using a mouse to operate the electronic device 4 while no button of the mouse is being held down, so compatibility between the stylus pen 5 and an iPad may be improved.

It should be noted that for a single control signal that is compatible with the HID protocol, an amount of movement of a mouse is limited. Therefore, multiple control signals may be required to cooperatively simulate a situation where a mouse is being moved across a long distance, wherein each of the multiple control signals is used to simulate that the mouse is being moved across a segment of the long distance. For example, in a scenario where a longest straight distance achievable by using a single control signal corresponds to 127 pixels, at least six control signals are required to cooperatively simulate a situation where a mouse is being moved across a straight distance that corresponds to 704 pixels.

It should be noted that in a scenario where the stylus pen 5 is being moved when the controller 3 operates in the hover-move sub-mode, the sensing module 2 may be unable to accurately detect the position of the stylus pen 5 relative to the touchpad 1 and thus the controller 3 may be unable to accurately determine the position of the stylus pen 5 based on the detection of the sensing module 2. Therefore, presenting only the cursor moving in the handwriting area 42 without presenting a trace of the cursor may prevent a jitter trace from being shown on the display panel 41.

When it is determined that the electronic device 4 is not an iPad (e.g., a Mac, a Chromebook or an IBM PC compatible computer) in the hover-move sub-mode, the controller 3 is configured to output a second control signal compatible with the HID protocol to the electronic device 4 to enable the electronic device 4 to present, on the display panel 41, the cursor moving in the handwriting area 42 along the moving vector in a manner that the cursor starts to move from an initial contact point on the handwriting area 42 that corresponds to the first contact position on the touchpad 1 and that the step size of movement of the cursor is presented in a relatively high resolution (e.g., 4096 DPI), without presenting a trace of the cursor. Hereinafter, such manner of cursor movement is also referred to as absolute positioning. It is worth to note that the second control signal enables the electronic device 4 to simulate a situation where the cursor is being moved by using a digitizer and a stylus pen together to operate the electronic device 4.

In a condition where the controller 3 operates in the inking sub-mode, when it is determined that the cursor is within the handwriting area 42 and that the stylus pen 5 is moved from a start position on the touchpad 1 toward an end position on the touchpad 1, the controller 3 is configured to determine a draw vector related to drawing an imaginary line connecting the start position and the end position on the touchpad 1, and to determine whether the electronic device 4 is an iPad.

When it is determined that the electronic device 4 is an iPad in the inking sub-mode, the controller 3 is configured to output a third control signal compatible with the HID protocol to the electronic device 4 to enable the electronic device 4 to present, on the display panel 41, a physical line being drawn in the handwriting area 42 according to the draw vector in the relative positioning manner, so that the physical line is drawn from another original point where the cursor originally stayed before drawing and a step size of drawing the physical line is presented in the relatively low resolution. Throughout this disclosure, the term "physical line" means a line that is presented on the display panel 41 and that is visible to a user. It is worth to note that the third control signal enables the electronic device 4 to simulate a situation where a physical line is drawn by dragging a mouse to operate the electronic device 4 with left/right button of the mouse being held down, so compatibility between the stylus pen 5 and an iPad may be improved.

When it is determined that the electronic device 4 is not an iPad in the inking sub-mode, the controller 3 is configured to output a fourth control signal compatible with the HID protocol to the electronic device 4 to enable the electronic device 4 to present, on the display panel 41, the physical line being drawn in the handwriting area 42 along the draw vector in the absolute positioning manner where the physical line is drawn from a beginning point that corresponds to the start position on the touchpad 1 and the step size of drawing the physical line is presented in the relatively high resolution. It is worth to note that the fourth control signal enables the electronic device 4 to simulate a situation where a physical line is drawn by using a stylus pen to exert pressure on a digitizer to operate the electronic device 4.

Since the touchpad device 100 is capable of adapting an absolute positioning device (e.g., the stylus pen 5) that is designed to operate in absolute positioning to a relative positioning device (e.g., an iPad) that only supports relative positioning, a user is able to use the stylus pen 5 and the touchpad device 100 together to operate an iPad.

It is worth to note that the way of presenting the physical line on the display panel 41 depends on the type of application software executed by the electronic device 4 or on what kind of device the electronic device 4 is (i.e., an iPad or not). For example, when the application software executed by the electronic device 4 is a drawing program, the physical line could be presented as a brushstroke; when the electronic device 4 is an iPad, the physical line could be presented as a handwriting.

When the controller 3 determines that either the stylus pen 5 or a finger has moved away from the touchpad 1, the controller 3 would switch from a current one of the stylus-pen mode and the finger-touch mode in which the controller 3 is currently operating back to the scanning mode.

Figure 5:
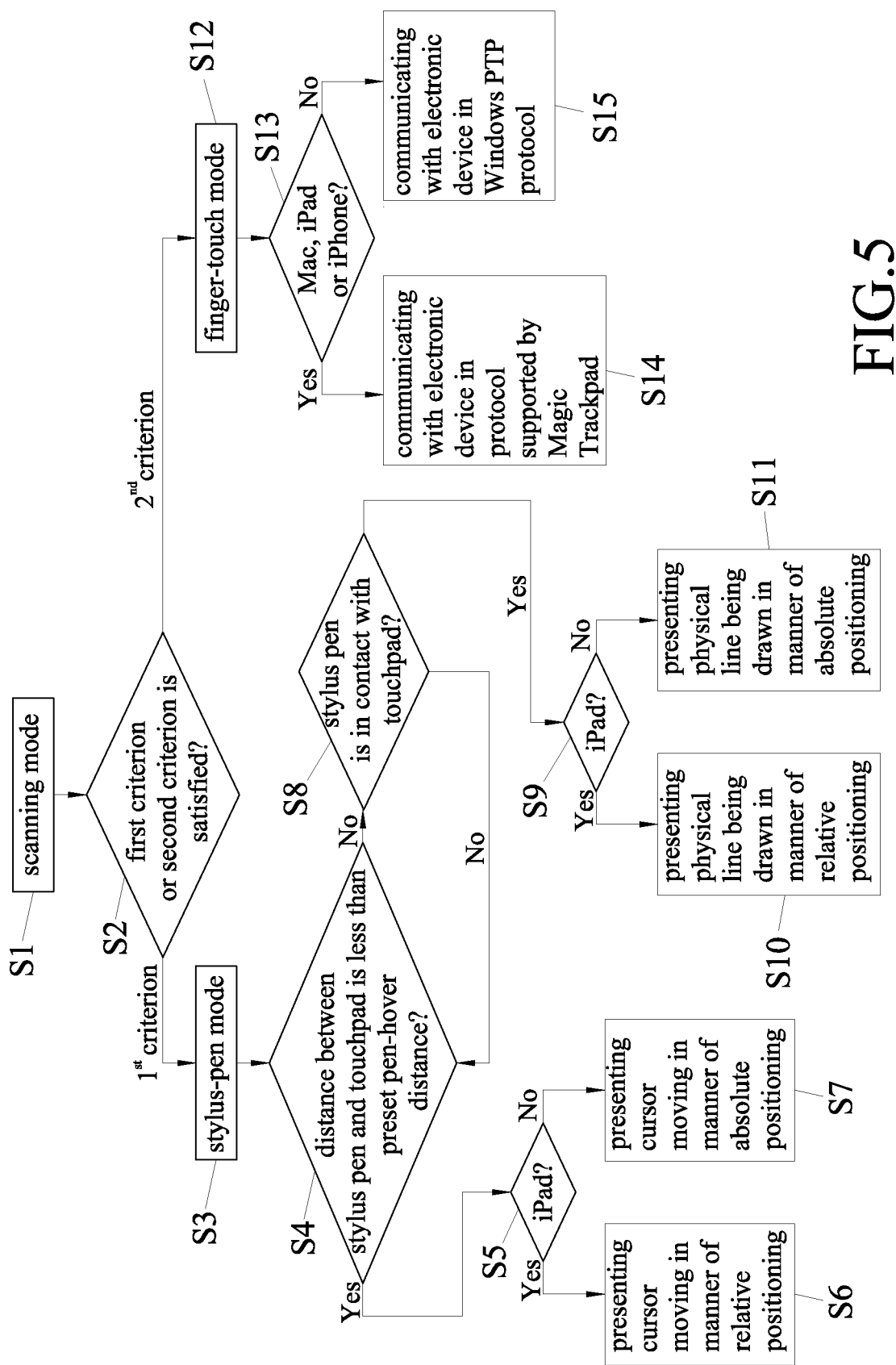
FIG. 5 is a flow chart illustrating an example of an operation method of the touchpad device according to an embodiment of the disclosure.

Referring to FIG. 5, an embodiment of an operation method of the touchpad device 100 according to the disclosure is illustrated. The operation method is to be implemented by the controller 3 of the touchpad device 100 that is previously described. The operation method includes steps S1 to S15 that are described below.

In step S1, the controller 3 first operates in the scanning mode.

In step S2, the controller 3 operating in the scanning mode determines whether a first criterion or a second criterion is satisfied, where the first criterion is that the distance between the stylus pen 5 and the touchpad 1 is less than the preset pen-in-range distance (D1) and the second criterion is that a finger is touching the touchpad 1. When the first criterion is satisfied, a procedure flow of the method proceeds to step S3. On the other hand, when the second criterion is satisfied, the procedure flow proceeds to step S12. It should be noted that satisfaction of the first criterion takes precedence over satisfaction of the second criterion. In one embodiment, the sensing module 2 and the antenna 6 can be implemented using a single sensing device, and determination as to whether the first criterion is satisfied and determination as to whether the second criterion is satisfied are made in a time-sharing manner. That is to say, the controller 3 alternately switches the sensing device to a first mode to serve as the antenna 6 for determining whether the first criterion is satisfied, and to a second mode to serve as the sensing module 2 for determining whether the second criterion is satisfied. For example, the touchpad device 100 has a sensing rate of 120 Hz, and the controller 3 determines whether the first criterion is satisfied within a first one one-hundred-and-twentieth seconds (i.e., the first $1/120$ seconds), determines whether the second criterion is satisfied within a second one one-hundred-and-twentieth seconds (i.e., the second $1/120$ seconds), determines whether the first criterion is satisfied within a third one one-hundred-and-twentieth seconds (i.e., the third $1/120$ seconds), determines whether the second criterion is satisfied within a fourth one one-hundred-and-twentieth seconds (i.e., the fourth $1/120$ seconds), and so on.

In step S3, the controller 3 switches to the stylus-pen mode, and controls the electronic device 4 to present the handwriting area 42 on the display panel 41. It should be noted that in the stylus-pen mode, the controller 3 does not output any control signal to the electronic device 4 in response to any user operation by a finger on the touchpad 1.

Next, in step S4, the controller 3 determines whether the distance between the stylus pen 5 and the touchpad 1 is less than the preset pen-hover distance (D2) but is non-zero. When it is determined that the distance between the stylus pen 5 and the touchpad 1 is less than the preset pen-hover distance (D2) but is non-zero, the controller 3 switches to the hover-move sub-mode and the procedure flow proceeds to step S5. Oppositely, the procedure flow proceeds to step S8.

In step S5, when it is determined that the cursor is within the handwriting area 42 and that the stylus pen 5 is moved from a first positon directly above a first contact position on the touchpad 1 toward a second position directly above a second contact position on the touchpad 1 and then moved downward to touch the second contact position, the controller 3 determines a moving vector related to movement from the first contact position to the second contact position on the touchpad 1, and determines whether the electronic device 4 is an iPad. When it is determined that the electronic device 4 is an iPad, the procedure flow proceeds to step S6. Contrarily, the procedure flow proceeds to step S7.

In step S6, the controller 3 outputs the first control signal compatible with the HID protocol to the electronic device 4 to enable the electronic device 4 to present, on the display panel 41, the cursor moving in the handwriting area 42 according to the moving vector in a manner that the cursor starts to move from an original point where the cursor originally stayed before moving and that a step size of movement of the cursor is presented in a relatively low resolution, without presenting a trace of the cursor.

In step S7, the controller 3 outputs the second control signal compatible with the HID protocol to the electronic device 4 to enable the electronic device 4 to present, on the display panel 41, the cursor moving in the handwriting area 42 along the moving vector in a manner that the cursor starts to move from an initial contact point that corresponds to the first contact position on the touchpad 1 and that the step size of movement of the cursor is presented in a relatively high resolution, without presenting a trace of the cursor.

In step S8, the controller 3 determines whether the stylus pen is in contact with the touchpad 1. When it is determined that the stylus pen 5 is in contact with the touchpad 1, the controller 3 switches to the inking sub-mode and the procedure flow proceeds to step S9. Oppositely, the procedure flow returns to step S4.

In step S9, when it is determined that the cursor is within the handwriting area 42 and that the stylus pen 5 is moved from a start position on the touchpad 1 toward an end position on the touchpad 1, the controller 3 determines a draw vector related to drawing an imaginary line connecting the start position and the end position on the touchpad 1, and determines whether the electronic device 4 is an iPad. When it is determined that the electronic device 4 is an iPad, the procedure flow proceeds to step S10. Contrarily, the procedure flow proceeds to step S11.

In step S10, the controller 3 outputs the third control signal compatible with the HID protocol to the electronic device 4 to enable the electronic device 4 to present, on the display panel 41, a physical line being drawn in the handwriting area 42 according to the draw vector in a manner that the physical line is drawn from an original point where the cursor originally stayed before drawing and that a step size of drawing the physical line is presented in the relatively low resolution.

In step S11, the controller 3 outputs the fourth control signal compatible with the HID protocol to the electronic device 4 to enable the electronic device 4 to present, on the display panel 41, the physical line being drawn in the handwriting area 42 along the draw vector in a manner that the physical line is drawn from a beginning point that corresponds to the start position on the touchpad 1 and that the step size of drawing the physical line is presented in the relatively high resolution.

In step S12, the controller 3 switches to the finger-touch mode. Then, the controller 3 determines in step S13 whether the electronic device 4 is a Mac, an iPad or an iPhone. When it is determined that the electronic device 4 is a Mac, an iPad or an iPhone, the procedure flow proceeds to step S14. Otherwise, when it is determined that the electronic device 4 is not a Mac, an iPad, or an iPhone, the procedure flow proceeds to step S15.

In step S14, the controller 3 communicates with the electronic device 4 in a protocol supported by a Magic Trackpad.

In step S15, the controller 3 communicates with the electronic device 4 in a Windows PTP protocol.

Figure 9:
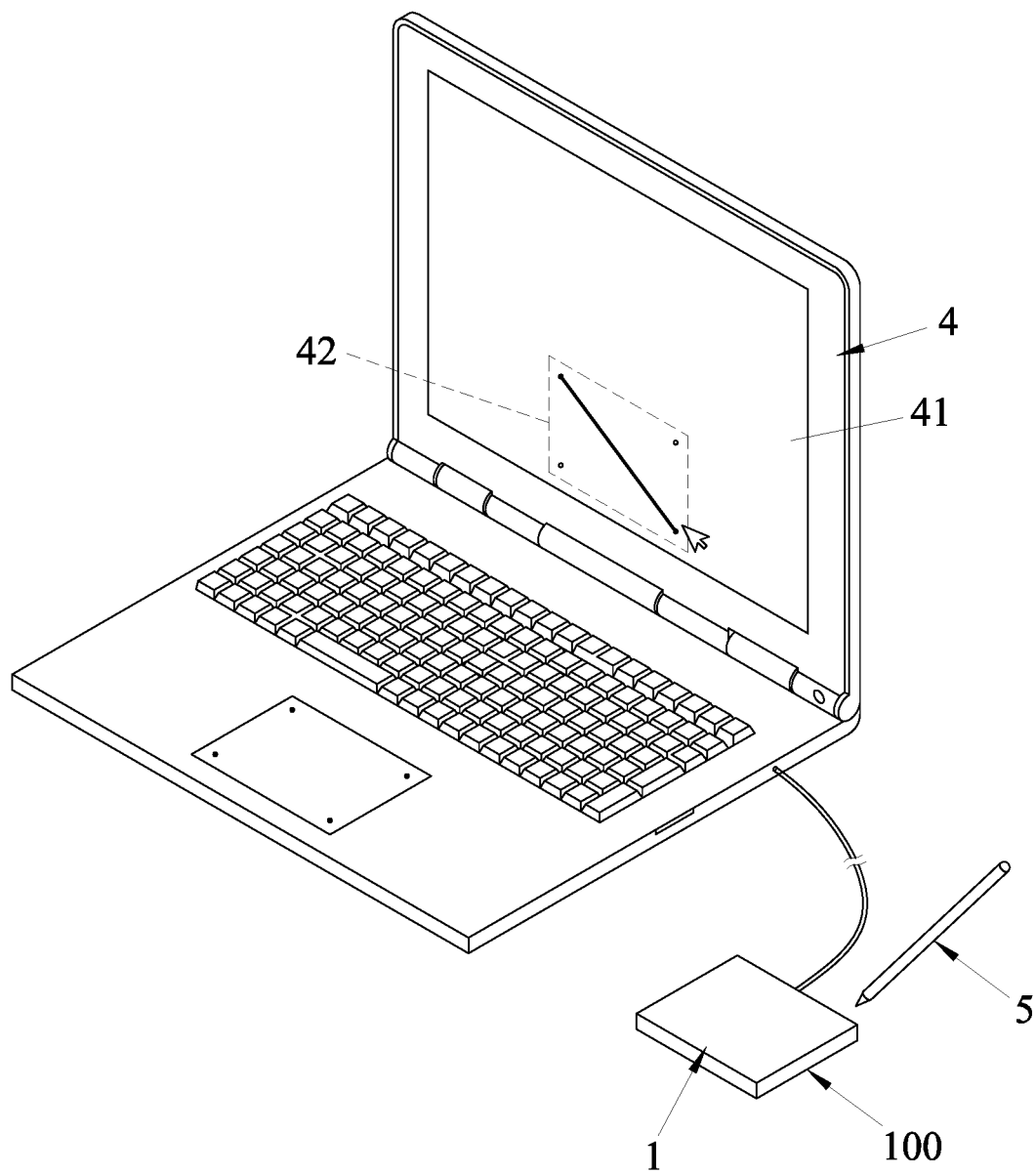
FIG. 9 is a perspective view illustrating an example of the touchpad device according to another embodiment of the disclosure.

Referring to FIG. 9, another embodiment of the touchpad device 100 according to the disclosure is illustrated. This embodiment is similar to the embodiment that is previously described. However, the touchpad device 100 is an external device and is externally and physically connected to the electronic device 4.

Figure 10:
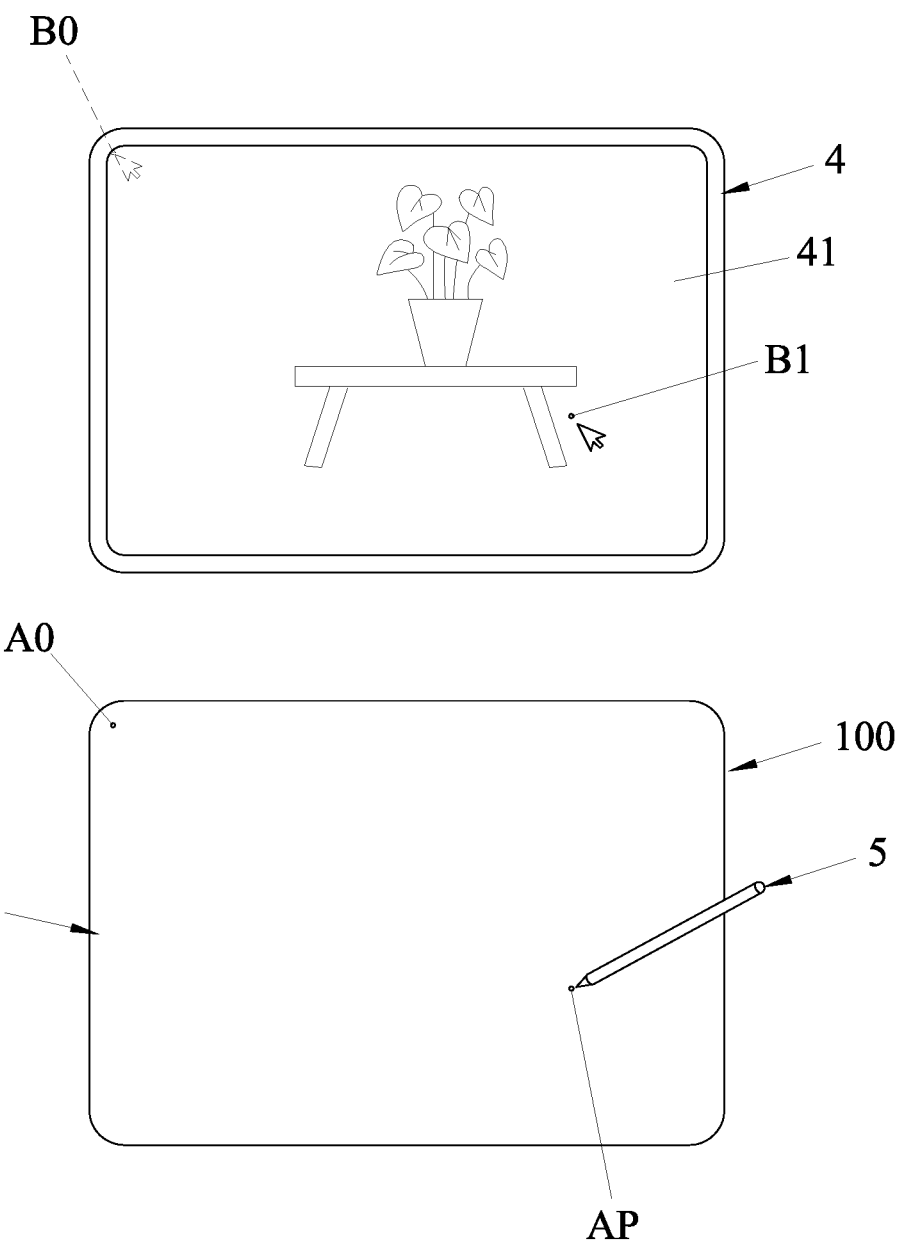
FIG. 10 is a schematic diagram illustrating an example of the touchpad device according to still another embodiment of the disclosure.

Referring to FIG. 10, still another embodiment of the touchpad device 100 according to the disclosure is illustrated. This embodiment is similar to the embodiment that is described with reference to FIG. 1, but is different therefrom as described below.

The touchpad device 100 of this embodiment is an external device and is externally and wirelessly connected to the electronic device 4, and is implemented by a digitizer. It is worth to note that the touchpad 1 of the touchpad device 100 has a size and a shape that are identical to those of the display panel 41 of the electronic device 4. The entire area of the display panel 41 serves as the handwriting area 42.

After the controller 3 determines that the stylus pen 5 has moved away from the touchpad 1 and switches from the stylus-pen mode back to the scanning mode, the controller 3 determines whether a predetermined time period has elapsed. The predetermined time period may be determined depending on performance of the electronic device 4 and sensitivity of the touchpad device 100 to the stylus pen 5 (which can be evaluated by a greatest distance between the touchpad device 100 and the stylus pen 5 at which the touchpad device 100 is still capable of detecting the stylus pen 5). In practice, the smaller the preset pen-in-range distance (D1), the longer the predetermined time period; the greater the preset pen-in-range distance (D1), the shorter the predetermined time period. In this embodiment, the predetermined time period ranges from 2 to 5 seconds, but is not limited thereto.

For initialization and calibration purposes, when it is determined that the predetermined time period has elapsed, the controller 3 would control the electronic device 4 to present, on the display panel 41, the cursor moving to a reference point (B0) at an upper-left corner of the display panel 41 (see FIG. 10 as an example). The touchpad 1 has a reference position (A0) that corresponds to the reference point (B0) of the display panel 41. In other variants of this embodiment, the reference point (B0) may be at a lower-left corner, an upper-right corner or a lower-right corner of the display panel 41. Further, when the stylus pen 5 is in contact with the touchpad 1 at an arbitrary position (AP) of the touchpad 1, the controller 3 would determine a moving vector related to movement from the reference position (A0) to the arbitrary position (AP) on the touchpad 1, and based on the moving vector, control the electronic device 4 to present, on the display panel 41, the cursor moving from the reference point (B0) to a point (B1) on the display panel 41 that corresponds to the arbitrary position (AP).

Figure 6:
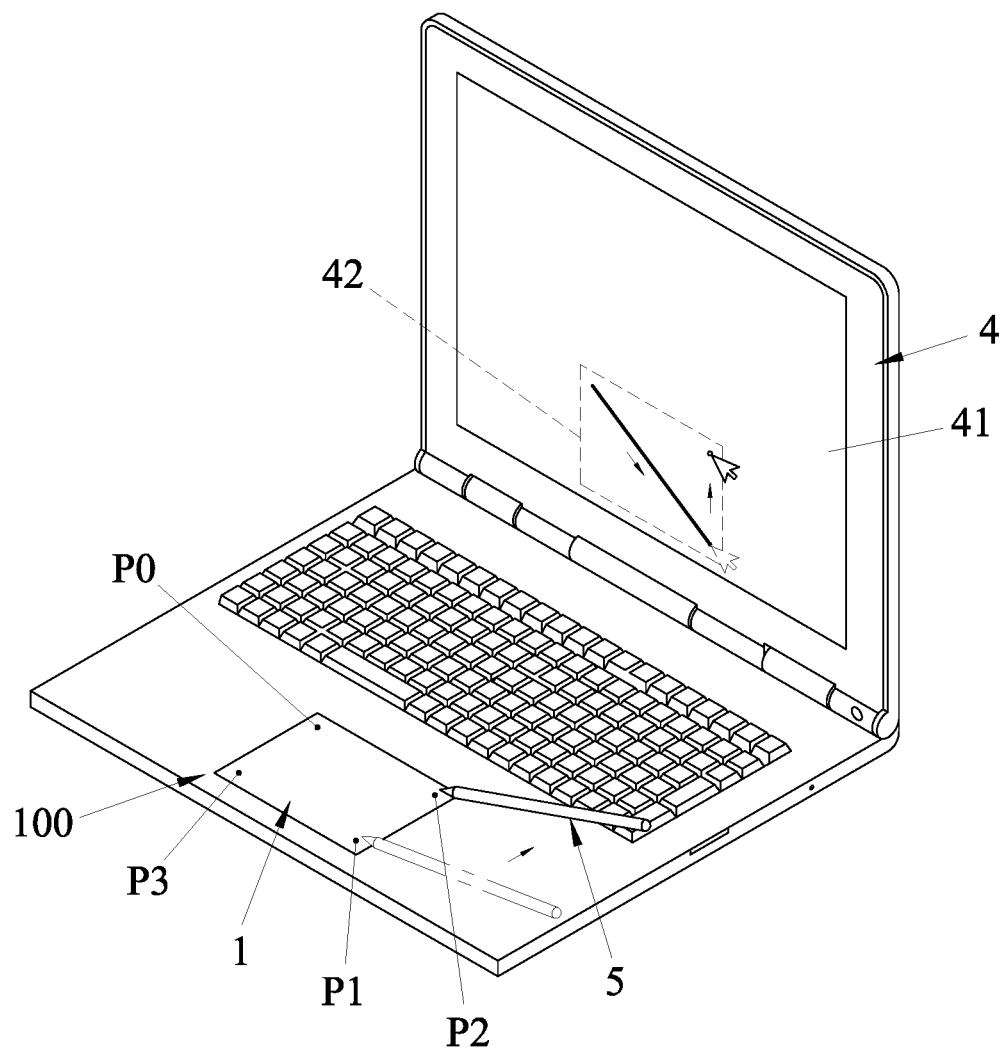
FIGS. 6 to 8 are schematic diagrams illustrating an example of operating the touchpad device under the stylus-pen mode according to an embodiment of the disclosure.
Figure 7:
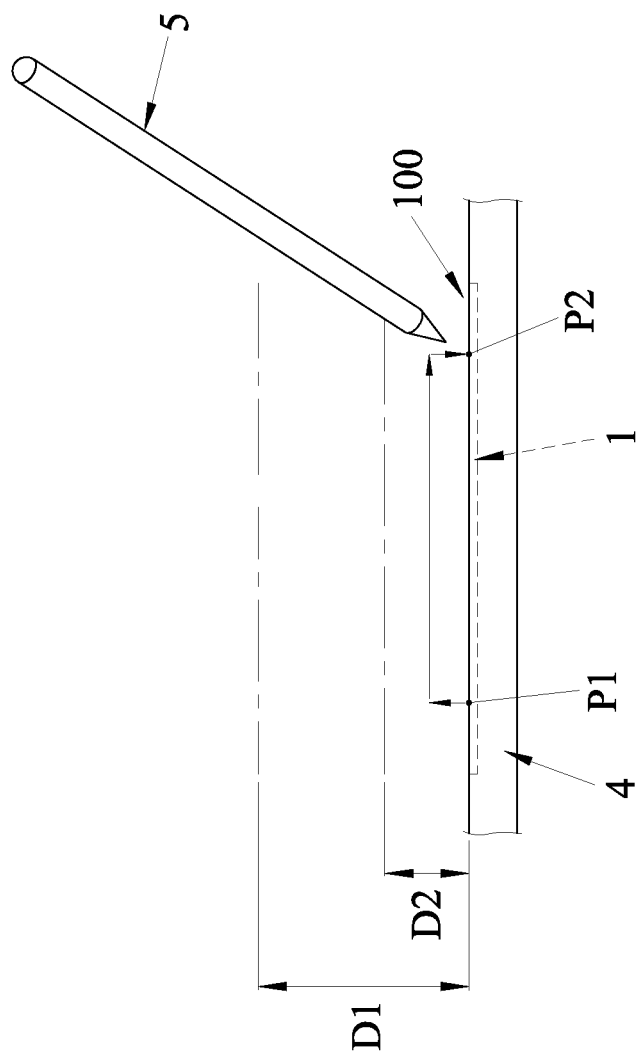
Figure 8:
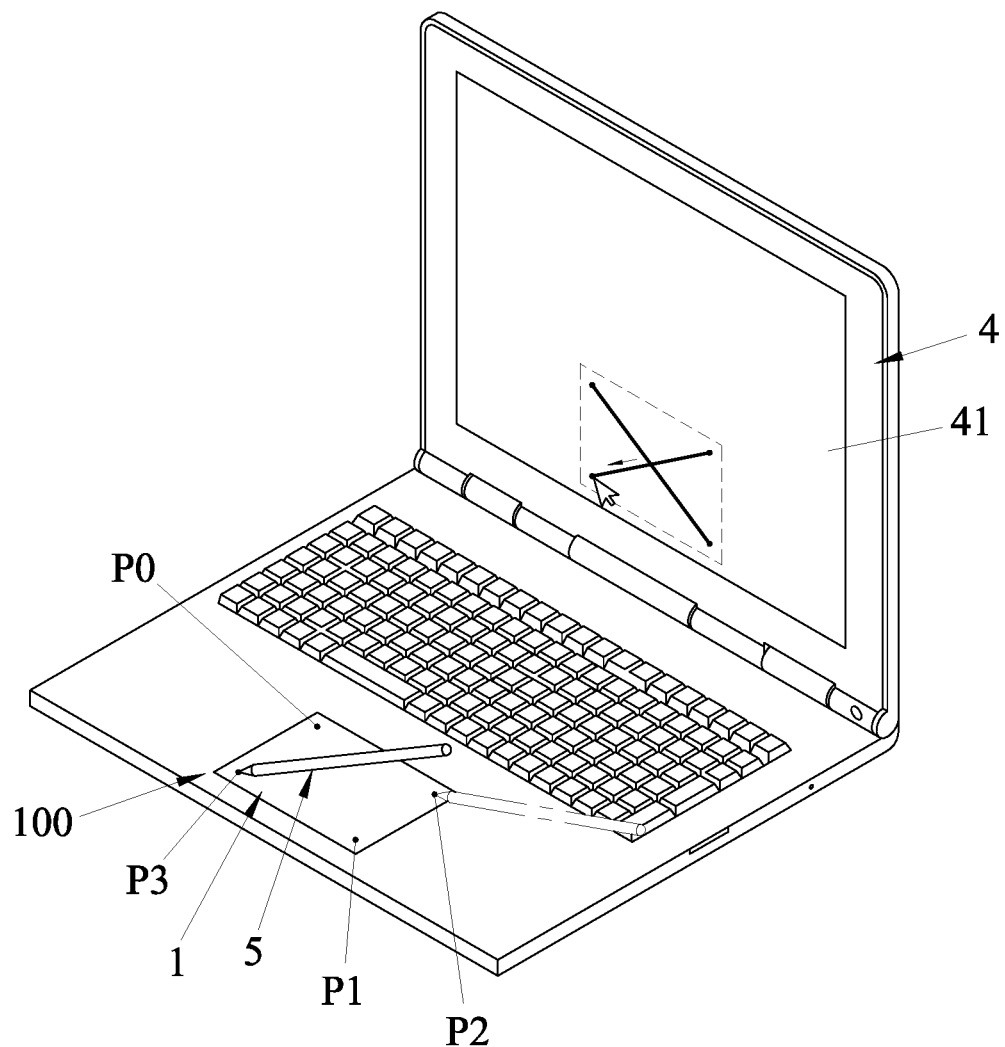

Referring to FIGS. 6 to 8, for better explanation, an example of operating the touchpad device 100 by using the stylus pen 5 to enable the electronic device 4 to present a letter "X" on the display panel 41 will be described. In this example, the electronic device 4 is an iPad, and the display panel 41 is a touchscreen.

In the beginning, the controller 3 operates in the scanning mode. When the stylus pen 5 is held by a user to approach the touchpad 1 and the controller 3 determines that the distance between the stylus pen 5 and the touchpad 1 is less than the preset pen-in-range distance (D1), the controller 3 switches to the stylus-pen mode, and controls the electronic device 4 to present the handwriting area 42 on the display panel 41. Then, the user operates the display panel 41 of the electronic device 4 to move the cursor into the handwriting area 42.

When the stylus pen 5 is held by the user to touch the touchpad 1 at an upper-left position (P0) on the touchpad 1 and the controller 3 determines that the stylus pen 5 is in contact with the touchpad 1, the controller 3 switches to the inking sub-mode. Subsequently, the stylus pen 5 is kept to be in contact with the touchpad 1 and is moved to a lower-right position (P1) on the touchpad 1. When it is determined that the cursor is within the handwriting area 42 and that the stylus pen 5 is moved from the upper-left position (P0) toward the lower-right position (P1), the controller 3 determines a draw vector related to drawing an imaginary line connecting the upper-left position (P0) and the lower-right position (P1). Further, the controller 3 determines that the electronic device 4 is an iPad, so the controller 3 outputs a control signal compatible with the HID protocol to the electronic device 4 to enable the electronic device 4 to present, in a manner of relative poisoning on the display panel 41, a physical line being drawn in the handwriting area 42 according to the draw vector. It is worth to note that the aforesaid control signal enables the electronic device 4 to simulate a situation where the physical line is drawn by dragging a mouse to operate the electronic device 4 with the left button of the mouse held down.

Next, when the stylus pen 5 is held by the user and is moved upward to be spaced slightly apart from the touchpad 1 and the controller 3 determines that the distance between the stylus pen 5 and the touchpad 1 is less than the preset pen-hover distance (D2) but is non-zero, the controller 3 switches to the hover-move sub-mode. As shown in FIG. 7, the stylus pen 5 is kept to be spaced apart from the touchpad 1, is moved from a first position directly above the lower-right position (P1) to a second position directly above an upper-right position (P2) of the touchpad 1, and then is moved downward to touch the touchpad 1 at the upper-right position (P2). When it is determined that the cursor is within the handwriting area 42 and that the stylus pen 5 is moved from the first positon toward the second position and then moved downward to touch the upper-right position (P2), the controller 3 determines a moving vector related to movement from the lower-right position (P1) to the upper-right position (P2). Further, the controller 3 determines that the electronic device 4 is an iPad, so the controller 3 outputs another control signal compatible with the HID protocol to the electronic device 4 to enable the electronic device 4 to present, in a manner of relative positioning on the display panel 41, the cursor moving in the handwriting area 42 according to the moving vector without presenting a trace of the cursor. It is worth to note that said another control signal enables the electronic device 4 to simulate a situation where the cursor is being moved by using a mouse to operate the electronic device 4 with no button of the mouse being held down.

After the stylus pen 5 touches the touchpad 1 at the upper-right position (P2), the controller 3 determines that the stylus pen 5 is in contact with the touchpad 1, and switches to the inking sub-mode again. The stylus pen 5 is kept to be in contact with the touchpad 1 and is moved from the upper-right position (P2) to a lower-left position (P3) on the touchpad 1. When it is determined that the cursor is within the handwriting area 42 and that the stylus pen 5 is moved from the upper-right position (P2) toward the lower-left position (P3), the controller 3 determines another draw vector related to drawing an imaginary line connecting the upper-right position (P2) and the lower-left position (P3). Further, the controller 3 determines that the electronic device 4 is an iPad, so the controller 3 outputs still another control signal compatible with the HID protocol to the electronic device 4 to enable the electronic device 4 to present, in a manner of relative poisoning on the display panel 41, another physical line being drawn in the handwriting area 42 according to said another draw vector, wherein said another physical line crosses the previous physical line. In this way, the task of presenting the letter "X" on the display panel 41 is completed. It is worth to note that said still another control signal enables the electronic device 4 to simulate a situation where said another physical line is drawn by dragging a mouse to operate the electronic device 4 with the left button of the mouse being held down.

To sum up, the touchpad device 100 according to the disclosure communicates with the electronic device 4 in a protocol or a signal format that is determined based on whether the electronic device 4 is developed by Apple Inc. (e.g., iPad, Mac, iPhone or the like) and runs an operating system developed by Apple Inc. (e.g., iOS, macOS or the like), so as to enable the electronic device 4 to present cursor-moving or drawing in a way (i.e., absolute positioning or relative positioning) that is supported by the electronic device 4. In this way, a user may be able to use the touchpad device 100 and the stylus pen 5 together to operate various kinds of the electronic devices, even when the electronic device is an iPad. Moreover, since it is not necessary to change a position of the touchpad device 100 between an upright position and a laid-down position when using the same, convenience of operating the electronic device 4 with the touchpad device 100 may be enhanced.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A touchpad device adapted to be operated by using a stylus pen, the stylus pen emitting an electromagnetic signal, said touchpad device comprising:

an antenna configured to receive the electromagnetic signal;

a touchpad; and a controller electrically connected to said touchpad, adapted to be electrically connected to an electronic device that includes a display panel, and configured to operate in a stylus-pen mode including steps of controlling the electronic device to present a handwriting area on the display panel, and when it is determined that a distance between the stylus pen and said touchpad is less than a preset pen-hover distance but is non-zero, operating in a hover-move sub-mode that includes steps of when it is determined that a cursor is within the handwriting area and that the stylus pen is moved from a first position directly above a first contact position on said touchpad toward a second position directly above a second contact position on said touchpad and then moved downward to touch the second contact position, determining a moving vector related to movement from the first contact position to the second contact position on said touchpad, outputting a first control signal to the electronic device to enable the electronic device to present, on the display panel, the cursor moving in the handwriting area according to the moving vector, without presenting a trace of the cursor, wherein said controller is configured to determine, based on an intensity of the electromagnetic signal received by said antenna, a distance between the stylus pen and said touchpad, wherein said controller is further configured to first operate in a scanning mode that includes steps of determining whether the distance between the stylus pen and said touchpad is less than a preset pen-in-range distance that is greater than the preset pen-hover distance, not outputting any control signal to the electronic device, and switching to the stylus-pen mode when it is determined that the distance between the stylus pen and said touchpad is less than the preset pen-in-range distance, wherein a size and a shape of the touchpad are identical to a size and a shape of the display panel of the electronic device, wherein after said controller determines that the stylus pen has moved away from said touchpad and switches from the stylus-pen mode back to the scanning mode, said controller is further configured to determine whether a predetermined time period has elapsed, when it is determined that the predetermined time period has elapsed, control the electronic device to present, on the display panel, the cursor moving to a reference point at an upper-left corner of the display panel, said touchpad having a reference position that corresponds to the reference point of the display panel, and when it is determined that the stylus pen is in contact with said touchpad at an arbitrary position of said touchpad, determine a moving vector related to movement from the reference position to the arbitrary position on said touchpad, and based on the moving vector, control the electronic device to present, on the display panel, the cursor moving from the reference point to a point on the display panel that corresponds to the arbitrary position.

2. The touchpad device as claimed in claim 1, further adapted to be operated by using a finger, and further comprising a sensing module that is electrically connected to said controller, and that is configured to detect a finger and to output a detection signal to said controller when detecting that a finger touches said touchpad, wherein the scanning mode further includes determining, based on the detection signal, whether a finger is touching said touchpad, and switching to a finger-touch mode to allow using a finger to operate said touchpad device when it is determined that a finger is touching said touchpad.

3. The touchpad device as claimed in claim 2, wherein when operating in the stylus-pen mode, said controller is configured to bypass any operation that is related to the finger-touch mode.

4. The touchpad device as claimed in claim 2, wherein when operating in the hover-move sub-mode of the stylus-pen mode, said controller is configured to bypass any operation that is related to the finger-touch mode.

5. The touchpad device as claimed in claim 1, wherein the stylus-pen mode further includes a step of when it is determined that the stylus pen is in contact with said touchpad, operating in an inking sub-mode that includes steps of:

bypassing any operation that is related to the finger-touch mode;

when it is determined that the cursor is within the handwriting area and that the stylus pen is moved from a start position on said touchpad toward an end position on said touchpad, determining a draw vector related to drawing an imaginary line connecting the start position and the end position on said touchpad; and outputting a second control signal to the electronic device to enable the electronic device to present, on the display panel, a physical line being drawn in the handwriting area according to the draw vector.

6. An operation method of a touchpad device, the touchpad device including a controller and a touchpad and being operable by using a stylus pen, the controller being electrically connected to the touchpad and an electronic device that includes a display panel, the stylus pen emitting an electromagnetic signal, the touchpad device further including an antenna that receives the electromagnetic signal, a size and a shape of the touchpad being identical to a size and a shape of the display panel of the electronic device, the operation method to be implemented by the controller and comprising a step of operating in a stylus-pen mode that includes steps of:

controlling the electronic device to present a handwriting area on the display panel;

when it is determined that a distance between the stylus pen and the touchpad is less than a preset pen-hover distance but is non-zero, operating in a hover-move sub-mode that includes steps of when it is determined that a cursor is within the handwriting area and that the stylus pen is moved from a first position directly above a first contact position on the touchpad toward a second position directly above a second contact position on the touchpad and then moved downward to touch the second contact position, determining a moving vector related to movement from the first contact position to the second contact position on the touchpad, outputting a first control signal to the electronic device to enable the electronic device to present, on the display panel, the cursor moving in the handwriting area according to the moving vector, without presenting a trace of the cursor;

determining, based on an intensity of the electromagnetic signal received by the antenna, a distance between the stylus pen and the touchpad;

operating in a scanning mode that includes steps of determining whether the distance between the stylus pen and the touchpad is less than a preset pen-in-range distance that is greater than the preset pen-hover distance, not outputting any control signal to the electronic device, and switching to the stylus-pen mode when it is determined that the distance between the stylus pen and the touchpad is less than the preset pen-in-range distance; and after determining that the stylus pen has moved away from the touchpad and after switching from the stylus-pen mode back to the scanning mode, determining whether a predetermined time period has elapsed, when it is determined that the predetermined time period has elapsed, controlling the electronic device to present, on the display panel, the cursor moving to a reference point at an upper-left corner of the display panel, the touchpad having a reference position that corresponds to the reference point of the display panel, and when it is determined that the stylus pen is in contact with the touchpad at an arbitrary position of the touchpad, determining a moving vector related to movement from the reference position to the arbitrary position on the touchpad, and based on the moving vector, controlling the electronic device to present, on the display panel, the cursor moving from the reference point to a point on the display panel that corresponds to the arbitrary position.

7. The operation method as claimed in claim 6, the touchpad device being further operable by using a finger, and including a sensing module that is electrically connected to the controller, and that is capable of detecting a finger and that outputs a detection signal to the controller when detecting that a finger is touching the touchpad, wherein the scanning mode further includes steps of:
  determining, based on the detection signal, whether a finger is touching the touchpad; and
  switching to a finger-touch mode to allow using a finger to operate the touchpad device when it is determined that a finger is touching the touchpad.

8. The operation method as claimed in claim 7, wherein the stylus-pen mode includes a step of bypassing any operation that is related to the finger-touch mode.

9. The operation method as claimed in claim 7, wherein the hover-move sub-mode of the stylus-pen mode includes a step of bypassing any operation that is related to the finger-touch mode.

10. The operation method as claimed in claim 6, wherein the stylus-pen mode further includes a step of when it is determined that the stylus pen is in contact with the touchpad, operating in an inking sub-mode that includes steps of:
  bypassing any operation that is related to the finger-touch mode;
  when it is determined that the cursor is within the handwriting area and that the stylus pen is moved from a start position on the touchpad toward an end position on the touchpad, determining a draw vector related to drawing an imaginary line that connects the start position and the end position on the touchpad;
  outputting a second control signal to the electronic device to enable the electronic device to present, on the display panel, a physical line being drawn in the handwriting area according to the draw vector.

* * * * *